DISTRIBUTED SUBSCRIBER CARRIER-CONCENTRATOR SYSTEM

Filed Aug. 28, 1968

INVENTORS C. G. DAVIS
D. HIRSCH
BY R. B. Ardis
ATTORNEY

Sept. 15, 1970 C. G. DAVIS ET AL 3,529,089

DISTRIBUTED SUBSCRIBER CARRIER-CONCENTRATOR SYSTEM

Filed Aug. 28, 1968 6 Sheets-Sheet 4

3,529,089

DISTRIBUTED SUBSCRIBER CARRIER-CONCENTRATOR SYSTEM

Claude G. Davis, Colts Neck, and Donald Hirsch, Matawan, N.J., assignors to Bell Telephone Laboratories, Incorporated, Murray Hill and Berkeley Heights, N.J., a corporation of New York Filed Aug. 28, 1968, Ser. No. 756,062
Int. Cl. H04j 3/08
U.S. Cl. 179—15 8 Claims

ABSTRACT OF THE DISCLOSURE

A multichannel delta modulation subscriber carrier-concentrator telephone system serves up to eighty subscribers over fourteen time-division channels. At a central office control terminal, a channel sequence position is assigned to each call and both message digits and such associated non-message control digits as companding and signaling digits are inserted in the bit stream in accordance with the assigned channel sequence position. An identification of the assigned channel sequence position is transmitted to the remote terminal serving the subscriber originating or receiving the call, stored there, and used to control the extraction of both message and associated non-message digits from the incoming bit stream and to control their reinsertion into the outgoing bit stream for transmission back to the central office control terminal.

BACKGROUND OF THE INVENTION

This invention relates generally to digital message transmission systems and more particularly to concentrator-equipped multichannel delta modulation subscriber carrier telephone systems.

In serving a large number of telephone subscribers from a central office, the most common practice has been to provide a separate pair of conductors for each subscriber, using voice frequency repeaters as needed whenever the distances are appreciable. Multichannel frequency division carrier equipment has been employed on a few occasions, particularly in rural areas when distances are sufficiently great to raise the cost of separate conductors and repeaters and their installation above that of the carrier equipment. Relatively high cost has, however, caused such equipment to be used somewhat sparingly in the so-called subscriber loop.

Modern digital and time division carrier techniques provide an attractive alternative for use in the subscriber loop and, particularly when supplemented by concentration, appear to promise some significant cost reductions. Delta modulation, which is simply single-digit differential pulse code modulation, permits the use of especially simple modulating and demodulating equipment and is particularly amenable to the distribution of remote terminal equipment at different locations along the carrier line. Such geographical distribution permits remote terminals to be located near groups of rural subscribers, with a resultant minimizing of the length of conductor pairs needed to connect the remote terminal equipment with the respective subscribers served. Distribution, however, places a premium upon controlling the concentration from the central office in order to avoid control equipment duplication and simplifying all remote terminal equipment to the greatest possible extent.

An object of the invention is to permit access to all time division channels by all subscribers in a distributed carrier-concentrator subscriber telephone system employing delta modulation in as simple a manner as possible.

Another and more particular object of the invention is to control such access entirely from the central office or control terminal regardless of where a call is originated.

Still another object of the invention is to permit as much simplification as possible of the remote or outlying terminals in a distributed carrier-concentrator subscriber telephone system employing delta modulation.

SUMMARY OF THE INVENTION

In accordance with the invention, a time division channel sequence position is assigned to each call in a multichannel delta modulation message transmission system interconnecting a control terminal and a number of remote terminals and not only message digits but also required non-message control digits are inserted in the bit stream in accordance with the assigned sequence position. The sequence position may and generally will be different for each call and depends primarily upon channel availability. When a channel sequence position is so assigned at the control terminal, its identity is transmitted to the remote terminal for which it is destined, stored there in local memory, and used to control the extraction of both message and control digits from the incoming bit stream. Complete freedom of channel assignment is thus made possible, regardless of the remote terminal from which the call originates or for which the call is destined, and all primary control circuits are centralized at the control terminal.

The invention is employed to particular advantage in the context of a distributed carrier-concentrator multichannel delta modulation subscriber telephone system in which the bit stream is made up of regularly recurring frames of binary digit time slots, each frame containing at least one cycle of a plurality of sequential groups, and each group including a sequential message digit time slot for each channel and at least one additional binary digit time slot exclusive of and in time sequence with the message digit time slots. As embodied in at least one such system, a particular feature of the invention involves the use of only a single remote terminal memory for each subscriber. From the control terminal, a message digit is transmitted in each group in the *message digit time slot* occupying the *assigned sequence position* and the associated non-message control digits are transmitted in selected ones of the additional digit time slots in the *group* occupying the *assigned sequence position* in selected cycles. In accordance with this feature of the invention, the number identification of the assigned sequence position is transmitted to the remote terminal and stored there in the appropriate local memory, where it is compared with the pulse trains generated by a pair of local counters. One of these counters, a fast counter, generates pulses at the digit time slot repetition rate and the other, a slow counter, generates pulses at the group repetition rate. In accordance with the invention, pulses from the counters occupying sequence positions corresponding to the stored sequence number are selected and used to control the extraction of both message and control digits from the incoming bit stream.

A more complete understanding of the invention and its several features may be obtained from a study of the following detailed description of a specific embodiment and the accompanying drawings.

DETAILED DESCRIPTION

Figure 1:
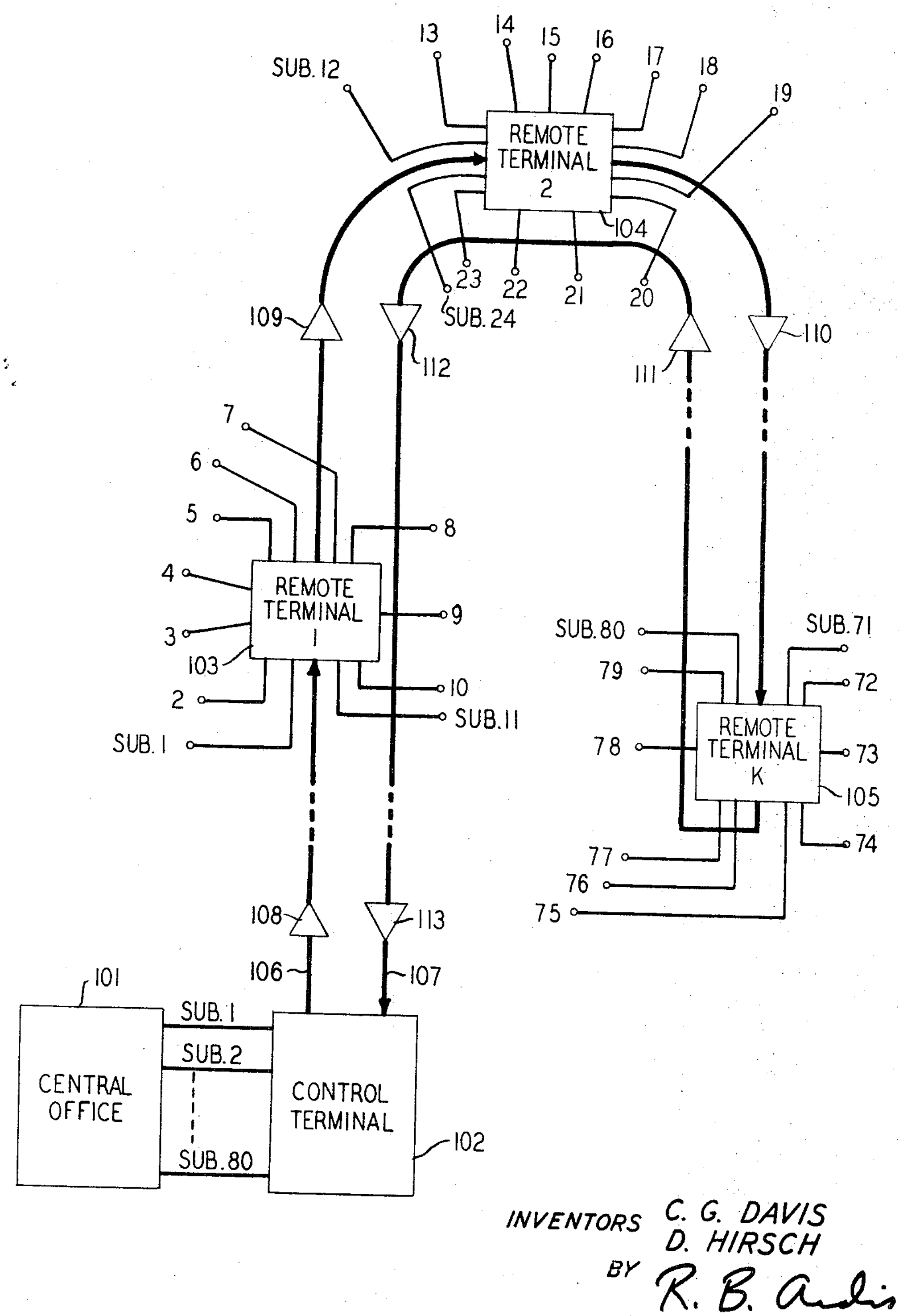
FIG. 1 is an overall block diagram of a multi-channel distributed delta modulation carrier-concentrator subscriber telephone system embodying the invention.

The distributed delta modulation carrier-concentrator subscriber telephone system shown in layout form in FIG. 1 serves up to eighty subscribers over fourteen time division channels from a central office 101. The system comprises a control terminal 102, located at the central office, and a number of remote terminals, of which terminals 103 through 105 are shown. Control terminal 102 has separate direct wire connections to the central office switching equipment for each subscriber served and provides 80 to 14 concentration. One-way digital transmission takes place over an outward line 106, which connects the transmitting portion of control terminal 102 with all *k* remote terminals in a tandem relationship, and an inward line 107, which connects the last remote terminal 105 back to the receiving portion of control terminal 102. A number of regenerative pulse repeaters, of which repeaters 108 through 113 are examples, are spaced at regular intervals along both outward line 106 and inward line 107. The regenerative repeaters may, for example, operate at a pulse repetition rate of 1.544 mHz. and take the form of those shown in U.S. Pat. 2,996,578, which issued Aug. 15, 1961, to F. T. Andrews, Jr.

The output from control terminal 102 in the embodiment of the invention illustrated in FIG. 1 is a digital bit stream having the same pulse repetition rate as the operating rate of the regenerative repeaters and is transmitted over outward line 106 to each remote terminal in succession. Each remote terminal extracts the information contained in the digit time slots intended for it and replaces the incoming information with appropriate outgoing information. The modified bit stream is passed on to the next remote terminal. The process continues in this manner, with the output of the last remote terminal 105 being returned to control terminal 102 over inward line 107. The system thus forms a complete loop, simplifying synchronization because only a single clock is required at each remote terminal. Were the system to have independent incoming and outgoing bit streams, two clocks would be required at each remote terminal.

The embodiment of the invention illustrated in FIG. 1 finds particularly ready application in the so-called rural subscriber loop. The eighty subscribers may, for example, be scattered along the length of a highway. The first remote terminal 103 may serve subscribers 1 through 11, the second remote terminal 104 may serve subscribers 12 through 24, and the last remote terminal 105 may serve subscribers 71 through 80, as shown. Each remote terminal is preferably located at a position along the digital line that results in distribution conductors of reasonable length and cost.

Figure 2:
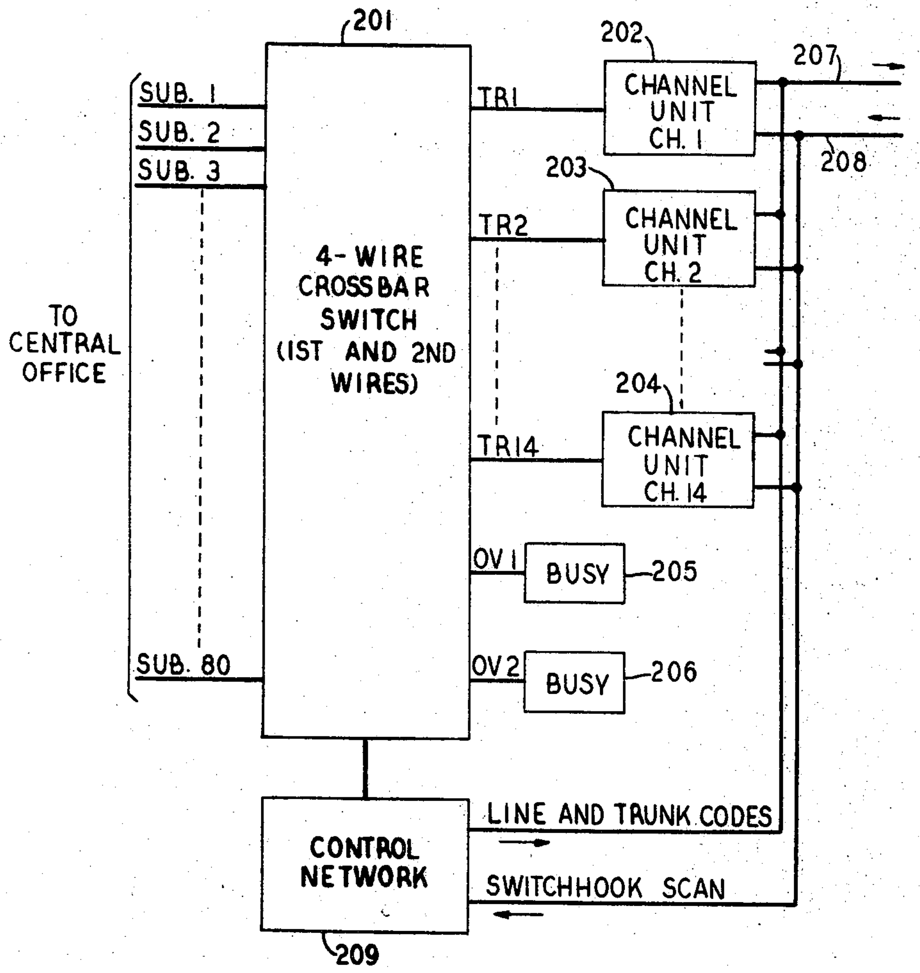
FIG. 2 is a block diagram of the control terminal used in the embodiment of the invention illustrated in FIG. 1.

FIG. 2 is a block diagram of control terminal 102 in the embodiment of the invention illustrated in FIG. 1. An important feature of the invention is the complete flexibility of channel assignment afforded, for both incoming and outgoing calls. Of the eighty subscribers served by the control terminal, only fourteen can have a channel assignment at any instant of time. It is possible, therefore, to use the delta modulators and demodulators and most of the rest of the interface equipment on a per channel basis. This is done at the control terminal by space division switching.

As shown in FIG. 2, the space division switch in the control terminal is a four-wire 16 by 80 crossbar switch 201, which provides not only selective connections from the eighty subscriber lines in the control terminal to the fourteen time division channels, but also the memory and control functions required for channel selection and service processing. Crossbar switch 201 is a standard telephone crossbar switch and includes eighty verticals and sixteen horizontals. When a crosspoint is made, the associated vertical is connected to the associated horizontal on each of the four wires. Thus, when crosspoint (1, 1) is made, vertical 1 is connected to horizontal 1 on each of the four wires and, when crosspoint (80, 16) is made, vertical 80 is connected to horizontal 16 in a similar manner.

In FIG. 2, the first two wires of each of the eighty verticals of crossbar switch 201 are connected at the left to a respective subscriber line at the central office and the first two wires of each of the sixteen horizontals are connected at the right to a respective one of fourteen message trunks and two overflow trunks. Each of the fourteen message trunks from crossbar switch 201 is connected to a channel unit, which contains the delta modulation and demodulation, companding, signaling, and other interface equipment between the message trunk and a corresponding time division message channel. Of the message trunks shown, trunk 1 is connected to channel unit 202, trunk 2 is connected to channel unit 203, and trunk 14 is connected to channel unit 204. The two overflow trunks are connected to busy signal generators 205 and 206, respectively.

To the left of the channel units in FIG. 2, transmission is on a so-called two-wire basis, with a single pair of conductors carrying message information in both directions between each channel unit and the corresponding pair of wires of crossbar switch 201. To the right of the channel units, however, transmission is on a four-wire basis, with separate pairs of conductors carrying message information in opposite directions. The output or transmitting conductors for all channel units are all connected to a single transmitting pair 207 and the input or receiving conductors are all connected to a single receiving pair 208.

Figure 3:
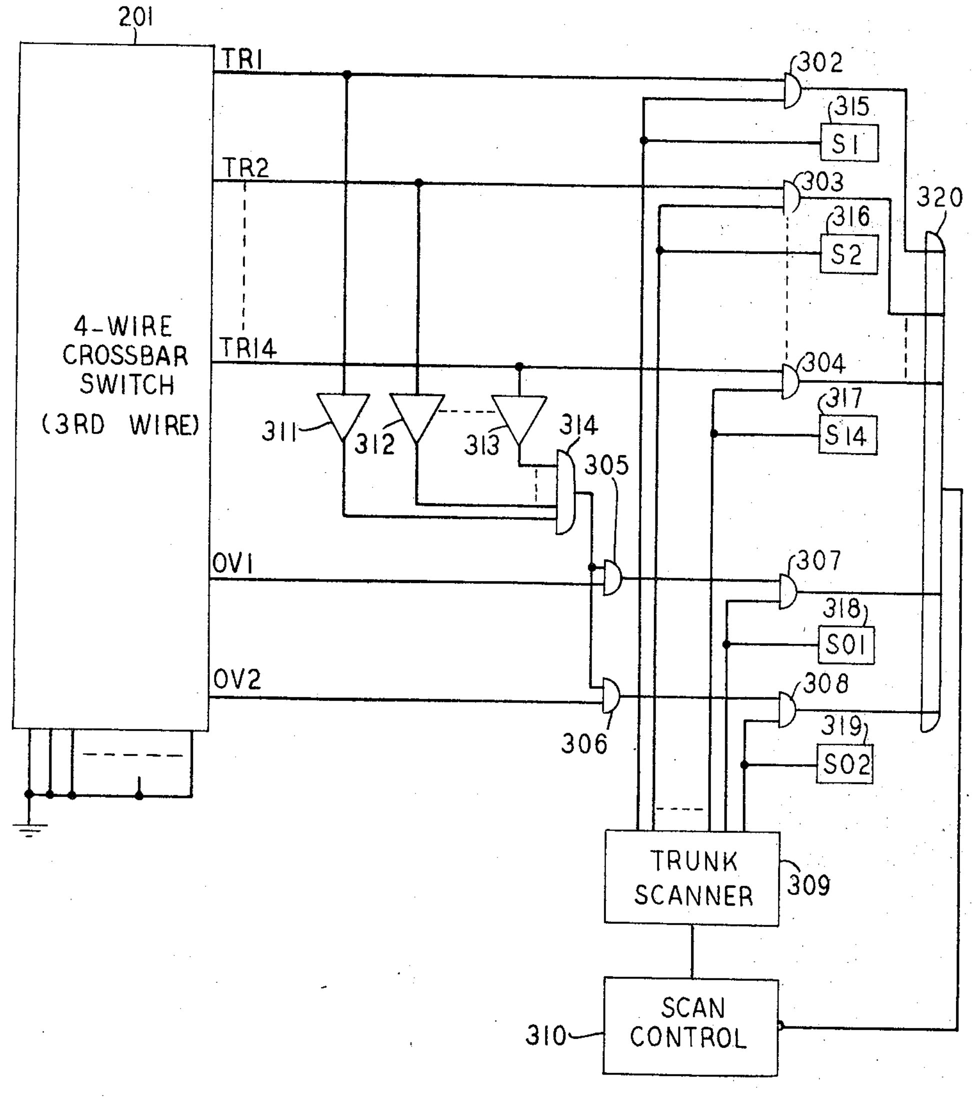
FIG. 3 is a block diagram of the channel selection portion of the control network used in FIG. 2.
Figure 4:
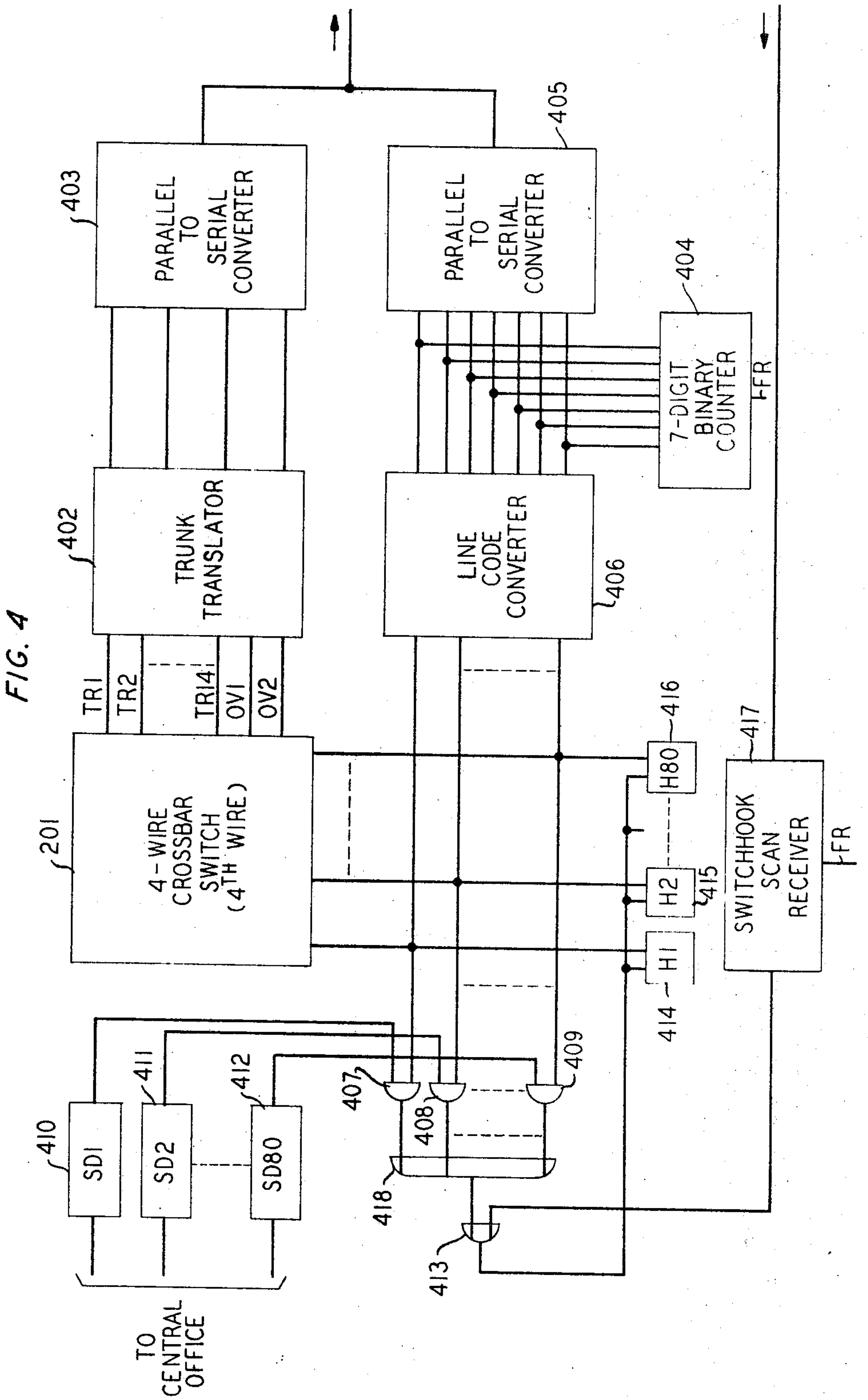
FIG. 4 is a block diagram of the memory status and service processing portion of the control network used in FIG. 2.

The operation of crossbar switch 201 in FIG. 2 is controlled by a control network 209, details of which are shown in FIGS. 3 and 4. In a manner which will be explained, control unit 209 supplies line and trunk codes in serial digital form to outgoing line 207 and receives switch hook scan information in serial digital form from incoming line 208.

The channel selection portion of the control network illustrated in FIG. 2 is shown in FIG. 3. The third wire of crossbar switch 201 is used, with all eighty verticals grounded. The first fourteen horizontals, corresponding to message trunks 1 through 14, are each connected to an input of a respective AND gate, of which AND gates 302 through 304 are shown. The remaining two horizontals, corresponding to overflow trunks 1 and 2, are each connected to an input of a respective one of a pair of AND gates 305 and 306, and the outputs of each are connected to an input of a respective one of another pair of AND gates 307 and 308. In the operation of the various AND gates, binary "0" is represented by ground and binary "1" is represented by a potential off ground.

A trunk scanner 309 in FIG. 3 has sixteen output leads and operates to place binary "1" on each of them in succession. The first fourteen output leads are connected to second inputs of the message trunk AND gates, of which AND gates 302 through 304 are shown. The remaining two output leads are connected to second inputs of overflow trunk AND gates 307 and 308. The outputs of AND gates 302 through 304 and AND gates 307 and 308 are all connected through an OR gate 320 to a scanning control circuit 310, which functions to inhibit trunk scanner 309 and stop its scan at whichever portion of its cycle it finds itself when binary "1" is received at its input.

Inverting amplifiers, of which amplifiers 311 through 313 are examples, are connected from each of the fourteen message trunks to an AND gate 314 and serve to change a binary "1" to a binary "0" and vice versa. The output of AND gate 314 is connected to the remaining inputs of AND gates 305 and 306. Finally, each of the outputs of trunk scanner 309 is connected to a respective one of sixteen crossbar switch select relays, of which select relays 315 through 319 are shown. Each of the select relays is relatively slow to operate and operates only when trunk scanner 309 is halted while it produces binary "1" on its respective output lead. Of the select relays shown, relay 315 is associated with message trunk 1, relay 316 is associated with message trunk 2, relay 317 is associated with message trunk 14, relay 318 is associated with overflow trunk 1, and relay 319 is associated with overflow trunk 2.

The memory status and service processing portion of the control network illustrated in FIG. 2 is shown in FIG. 4. The fourth wire of crossbar switch 201 is used, with all sixteen horizontals connected to a trunk translator circuit 402. Translator circuit 402 is a logic circuit with sixteen input leads and four output leads and responds to a binary "1" on any one of its input leads by generating the binary number unique to that input lead in parallel form on its four output leads. The four output leads from trunk translator 402 are connected to a parallel-to-serial converter 403, which changes the received binary number from parallel-to-serial form for transmission in the appropriate digit time slots over the outward digital line. The output from parallel-to-serial converter 403 is connected to the outgoing line, as illustrated by the connection from control network 209 to outgoing line 207 in FIG. 2.

The eighty verticals of the fourth wire of crossbar switch 201 in FIG. 4 are scanned under the control of a seven-digit binary counter 404. Counter 404 counts from 1 to 80 in sequence in binary code form on its seven output leads. Each of the binary numbers generated is supplied to a parallel-to-serial converter 405, which changes it to serial form for transmission in the appropriate digit time slots over the outward digital line. Like that from converter 403, the output from parallel-to-serial converter 405 is connected to the outgoing line.

The binary numbers generated in sequence by binary counter 404 are also supplied to a line code converter circuit 406, which has eighty output leads and converts each binary number supplied to its input leads to a binary "1" on the output lead individual to that particular number. Each of the output leads from line code converter 406 is connected to a respective one of the eighty verticals of the fourth wire of crossbar switch 201 and to an input of a respective one of eighty AND gates, of which AND gates 407 through 409 are shown. The remaining input of each AND gate is driven from the central office through a respective one of eighty sleeve detectors, of which detectors 410 through 412 are shown. Each sleeve detector is associated with a respective subscriber line at the central office and operates to detect a ground on a conductor sleeve, indicating a request for service or an off-hook condition, and convert it to a binary "1" at the respective AND gate. The outputs of all eighty AND gates represented by AND gates 407 through 409 are connected through an OR gate 418 to one input of an OR gate 413.

Each of the eighty crossbar switch verticals shown in FIG. 4 is also connected to an input of a respective one of eighty crossbar switch hold relays, of which hold relays 414 through 416 are shown. A second input of each of the hold relays is supplied from the output of OR gate 413, the presence of binary "1" at both inputs being necessary to operate each hold relay. Finally, a second input of OR gate 413 is driven from a switch hook scan receiver 417, which receives incoming information from the inward line in digital form, indicating the switch hook status of each of the subscriber lines at their respective remote terminals. As shown in FIG. 2, this input to the control network is received from the incoming line 208.

Figure 5:
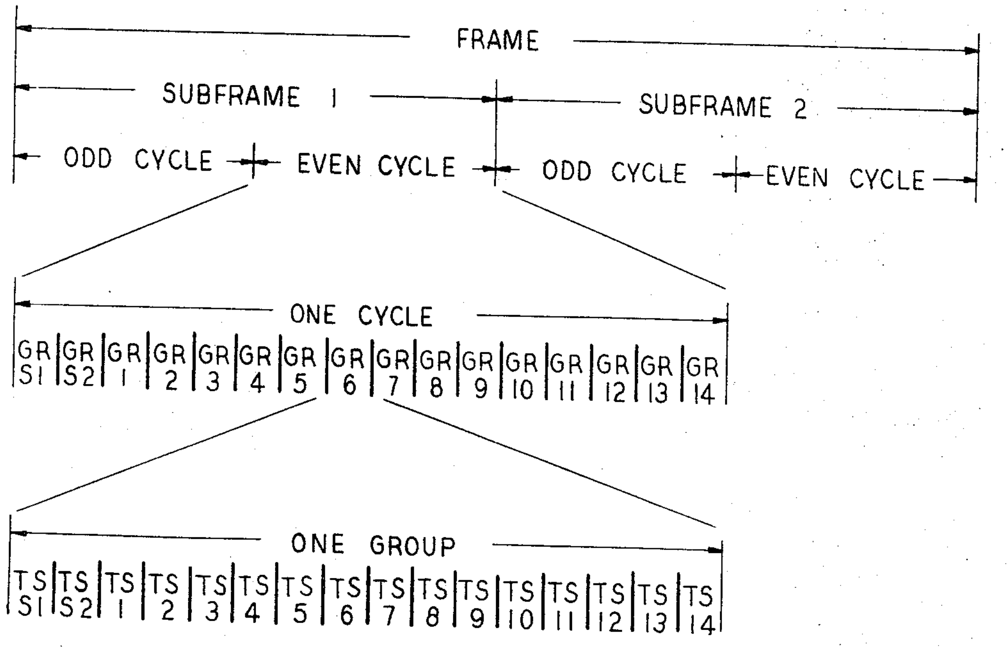
FIG. 5 is a timing diagram for the multichannel delta modulation carrier system illustrated in FIG. 1.

The basic bit stream organization employed by the embodiment of the invention shown in FIGS. 1 through 4 is illustrated in FIG. 5. The bit stream is made up of regularly recurring frames of binary digit time slots. As shown in FIG. 5, each frame is made up of a pair of sub-frames, sub-frame 1 and sub-frame 2. Each sub-frame is further divided into a pair of cycles, an odd cycle and an even cycle. Finally, each cycle is made up of sixteen sequential groups and each group is made up of sixteen sequential digit time slots, as shown. The digit time slots all have a basic pulse repetition or bit rate of 1.544 mHz.

As shown in FIG. 5, the first two time slots of each group, labeled TSS1 and TSS2, are special purpose time slots used for such non-message control purposes as companding and signaling. The remaining time slots of each group, labeled TS1 through TS14, are the message digit time slots. Each group contains one of these message digit time slots for each of the corresponding fourteen sequential time division channels of the system. Time slot TS1 carries the message digits of time division channel 1, time slot TS2 carries those of time division channel 2, and so on. The cycle organization is similar in that the first two groups of each cycle, labeled GRS1 and GRS2, are special purpose groups with respect to the use of their non-message time slots and in that the remaining groups, labeled GR1 through GR14, are individually associated with the respective system time division channels with corresponding sequence numbers. Thus, at least some of the non-message time slots of group GR1 are associated with time division channel 1, at least some of those of group GR2 are associated with time division channel 2, and so on.

Figure 6:
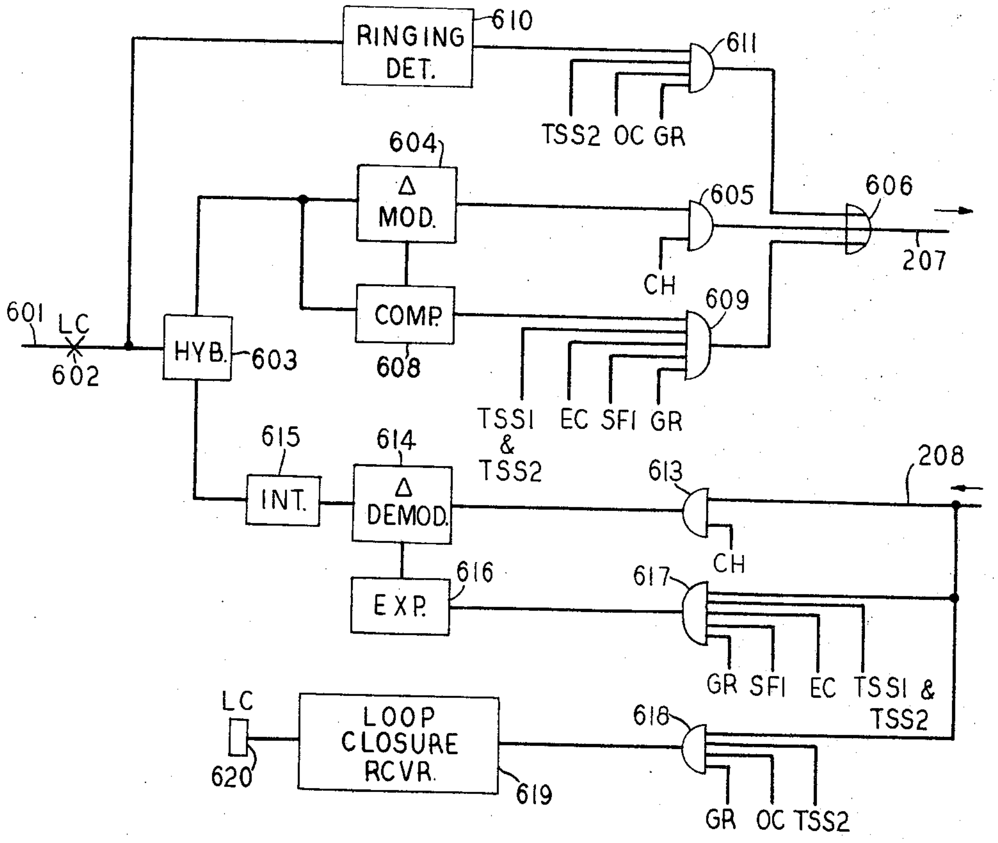
FIG. 6 is a block diagram of a channel unit for use in the control terminal shown in FIG. 2.

An individual channel unit suitable for use in the control terminal shown in FIG. 2 is illustrated in block diagram form in FIG. 6. As stated above, the channel unit constitutes the interface at the control terminal between a space division trunk and the assigned time division channel and includes not only delta modulation equipment but also the necessary companding and signaling equipment.

At the left in FIG. 6, the channel unit is connected to the first two wires of its respective crossbar switch horizontal by a connecting trunk 601. Trunk 601 is connected through a contact 602 of a loop closure relay LC to the two-wire input-output port of a hybrid network 603. Hybrid network 603 functions in the usual manner as the interface between two-wire and four-wire transmission and its transmitting port is connected to a delta modulator 604. Delta modulator 604 has its output connected through an AND gate 605 and an OR gate 606 to the outgoing transmission line 207. In addition, delta modulator 604 has its step size controlled by a suitable syllabic compressor 608. Compressor 608 receives an analog input from the transmitting port of hybrid network 603 and transmits a two-digit code group inlicative of the selected step size to OR gate 606 through an AND gate 609. Together, delta modulator 604 and compressor 608 may take the form of those in the delta mdoulation system with discrete syllabic companding shown in application Ser. No. 674,943, which was filed Oct. 12, 1967, by S. J. Brolin. The remaining portion of the transmitting section of the channl unit illustrated in FIG. 6 includes a ringing detector 610 connected to trunk 601 between relay contact 602 and hybrid network 603 and an AND gate 611 connected between the output side of ringing detector 610 anl OR gate 606.

The portion of the channel unit which has thus far been described operates to transmit not only message digits but also the necessary companding and signaling digits in their proper time slots. In the control terminal, each channel unit is permanently assigned to a particular sequential position in the bit stream within each group and within each cycle. The channel unit for channel 1, for example, is assigned time slot TS1 within each group for the transmission of its message digits and time slots TSS1 and TSS2 of group GR1 within each cycle for the transmission of its non-message digits. In a similar manner, the channel unit for channel 2 is assigned time slot TS2 within each group and group GR2 within each cycle.

In the channel unit illustrated in FIG. 6, the message and non-message digits are inserted in their respective time slots by AND gates 605, 609, and 611. Delta modulator 604 operates at a sampling rate of 96.5 kHz. and supplies message digits at that rate to AND gate 605. These digits may, of course, be broader than a single time slot in width. Channel timing pulses CH occupying only a single time slot or less are supplied to input CH of AND gate 605. These channel pulses have a 96.5 kHz. repetition rate, occurring once each group during the time slot assigned. As a result, AND gate 605 supplies one message digit for each group in the time slot assigned to its channel unit.

The companding digits generated by compandor 608 are inserted in their appropriate time slots by AND gate 609. As explained in the above-identified Brolin application, compandor 608 generates a two-digit code once each frame indicating the step size employed by delta modulator 604. This two-digit code is supplied to AND gate 609. In addition, AND gate 609 is supplied with timing pulses GR, SF1, EC, TSS1, and TSS2. The GR timing pulses have the group repetition rate of substantially 6 kHz., occupy substantially an entire group, and occur once each cycle during the group occupying the assigned sequence position. The SF1 pulses occur during subframe 1 and occupy substantially the entire sub-frame, while the EC pulses occur during each even cycle and occupy substantially the entire cycle. Finally, the TSS1 and TSS2 pulses are a single time slot or less in duration and occur during time slots TSS1 and TSS2 of each cycle. As a result, the companding digits received from compressor 608 are transmitted during time slots TSS1 and TSS2 of the assigned group in every even cycle of sub-frame 1.

The final transmitting path in the channel unit shown in FIG. 6 is the ringing path. Ringing detector 610 generates binary "1" at its output only when a ringing signal is detected on trunk 601. At other times, its output remains binary "0." In addition to the output received from ringing detector 610, AND gate 611 is supplied with GR, OC, and TSS2 timing pulses. Like those appliel to AND gates 609, the GR timing pulses appear at the group rate, occupy substantially an entire group, and occur once each cycle during the group occupying the assigned sequence position. The OC timing pulses occur during each odd cycle, while the TSS2 pulses occur during time slot TSS2 of each cycle and are a single time slot or less in duration. Ringing digits are thus transmitted in time slot TSS2 of the assigned group in each odd cycle.

The receiving portion of the channel unit illustrated in FIG. 6 is connected to the incoming transmission line 208 and includes an AND gate 613 to extract message digits for application to a delta demodulator 614. Channel timing pulses CH are supplied to AND gate 613 to select the proper message digits. The output from delta demodulator 614 is supplied to the receiving port of hybrid network 603 through an intergating circuit 615. The step size employed by delta demodulator 614 is controlled by a syllabic expandor 616, which is made to track the compressor at the opposite end of the line by the companding digits received from incoming line 208. These companding digits are supplied to expandor 616 through an AND gate 617. AND gate 617, in turn, is supplied with GR, SF1, EC, TSS1, and TSS2 timing pulses like those supplied to AND gate 609. Delta demodulator 614 and expandor 616 may take the form shown in the above-identified application of S. J. Brolin.

The final receiving path in the channel unit shown in FIG. 6 is the signaling path. An AND gate 618 is connected to incoming line 208 to select the incoming signaling digits intended for the channel unit and is supplied with GR OC, and TSS2 timing pulses like those supplied to AND gate 611. The output from AND gate 618, which is binary "1" when the telephone set served by the remote terminal is off-hook and binary "0" when it is on-hook, is supplied to a loop closure receiver 619. Loop closure receiver 619 is, in turn, connected to the operating coil 620 of relay LC and functions to cause latter to present a low impedance to trunk 601 when binary "1" is received.

Figure 7:
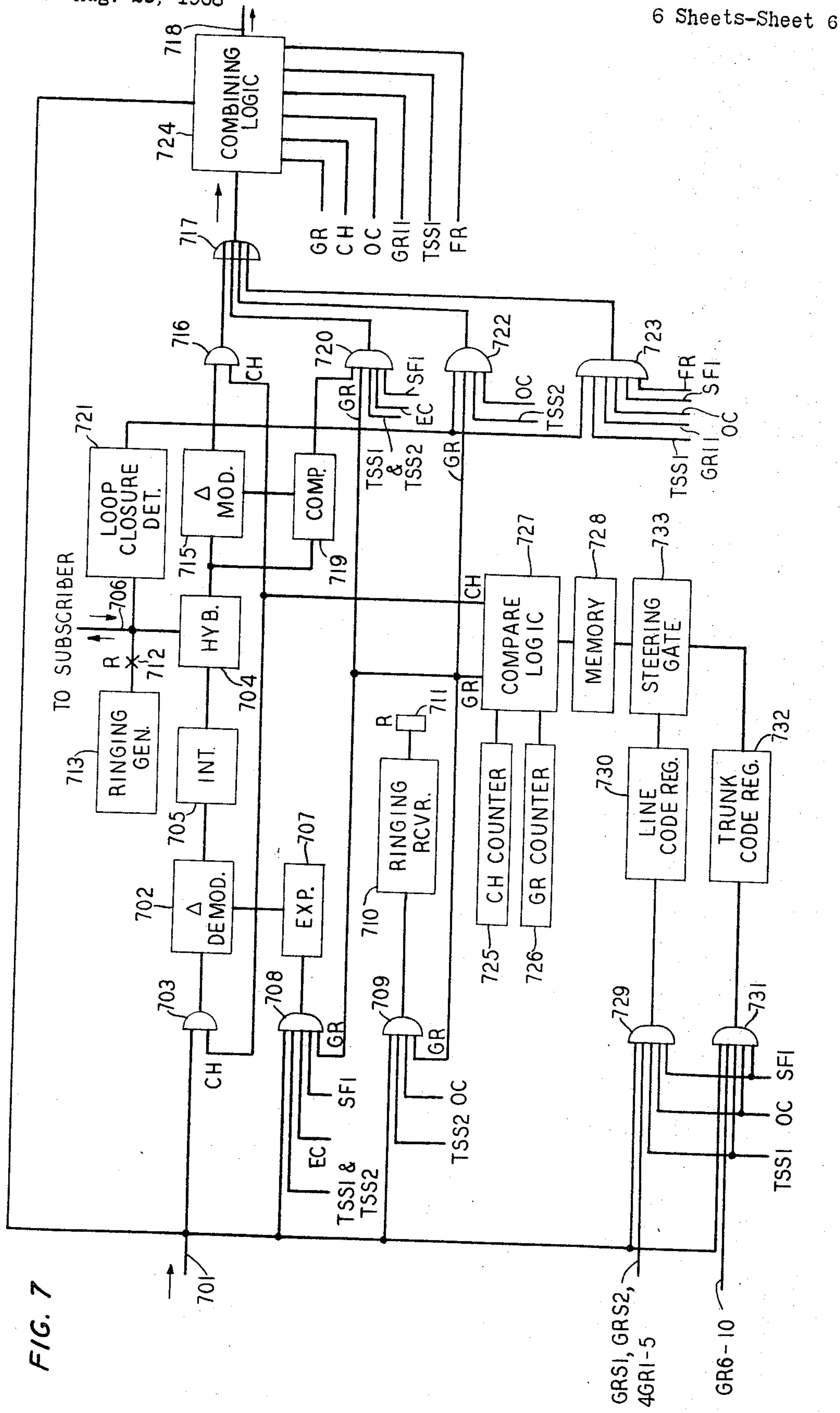
FIG. 7 is a block diagram of a portion of a remote terminal used in the embodiment of the invention illustrated in FIG. 1.

A portion of a remote terminal suitable for use in the embodiment of the invention illustrated in FIG. 1 is shown in block diagram form in FIG. 7. The equipment serves to illustrate the manner in which any desired number of lines may be served.

The incoming digital line 701 at the upper left in FIG. 7 is the outward line from the control terminal and is connected to a delta demodulator 702 through an AND gate 703. Channel pulses CH are supplied to the remaining input of AND gate 703 in a manner to be described later. The output from delta demolulator 702 is supplied to the receiving port of a hybrid network 704 through a suitable integrating circuit 705. The two-wire transmitting and receiving port of hybrid network 704 is connected to the subscriber line 706.

Like the delta demodulator in the control terminal, delta demodulator 702 in the remote terminal is provided with an expandor 707. Expandor 707 is complementary to the syllabic compressor at the control terminal in the channel unit from which the remote terminal is receiving digits and receives its two-digit control code from incoming line 701 by way of an AND gate 708. As indicated, the remaining inputs of AND gate 708 are supplied with GR, SF1, EC, TSS1, and TSS2 timing pulses in the same manner as AND gate 609 in the channel unit shown in FIG. 6. The group timing pulses GR do not necessarily have the same sequence number from one call to another, however, but differ as the specific channel assignment differs. Both delta demodulator 702 and expandor 707 may take the form of those shown in the above identified application of S. J. Brolin.

Signaling digits are extracted from the incoming bit stream by an AND gate 709 and applied to a ringing receiver 710. AND gate 709 is supplied with GR, OC, and TSS2 timing pulses in the manner of AND gate 611 in FIG. 6 and, when binary "1" is detected in time slot TSS2 during odd cycles of the group having the designated sequence position, ringing receiver 710 functions to supply a current to the operating coil 711 of a ringing relay R. A make contact 712 of relay R connects a local ringing current generator 713 to the local subscriber line 706.

In the transmitting portion of the remote terminal shown in FIG. 7, the transmitting port of hybrid network 704 is connected to a delta modulator 715 and the output of delta modulator 715 is connected through an AND gate 716 and an OR gate 717 to the outgoing digital transmission line 718. Delta modulator 715 is provided with a syllabic compressor 719 to control its step size. Compressor 719 is controlled from the message wave received from hybrid network 704 and provides a two-digit output indicating the step size. This two-digit code is transmitted through an AND gate 720 and OR gate 717 to outgoing transmission line 718. AND gate 720, like AND gate 609 in FIG. 6, is provided with GR, SF1, EC, TSS1, and TSS2 timing pulses on its remaining inputs. Both delta modulator 715 and compressor 719 may take the form of those shown in the previously mentioned application of S. J. Brolin.

The final transmitting paths in FIG. 7 serve to transmit signaling information indicating the idle or busy state of subscriber line 706 back to the control terminal and the central office. A loop closure detector 721, which generates binary "1" whenever the subscriber telephone set is off-hook and binary "0" whenever it is on-hook, is connected between subscriber line 706 and one input of an AND gate 722. The remaining inputs of AND gate 722 are supplied with GR, OC, and TSS2 timing pulses in the same manner as AND gate 709 and the output is connected through OR gate 717. The output of OR gate 717 is then combined by logic circuitry 724 with the bits of the incoming transmission line 701 which are not used by the remote terminal to form the outgoing bit stream on output line 718.

In addition, the output of loop closure detector 721 is connected to another AND gate 723 and from there through OR gate 717 to outgoing digital line 718. AND gate 723 is supplied with SF1, OC, GR11, and TSS1 timing pulses, as shown. In addition, AND gate 723 is supplied with a timing pulse FR which is a full frame in duration and occurs once each eighty frames in a sequence position unique to one particular subscriber line.

An important feature of the invention resides in the manner in which channel and group timing pulses are supplied in the remote terminal equipment illustrated in FIG. 7. At the remote terminal, a channel counter 725 and a group counter 726 are common to all of the locally served subscriber lines. Channel counter 725 is a fast counter and generates timing pulses at the system bit rate of 1.544 mHz. Group counter 726, on the other hand, is a slower counter and generates timing pulses which are substantially a full group in duration and occur at a 96.5 kHz. repetition rate. One timing pulse per group is selected from channel counter 725 and one timing pulse per cycle is selected from group counter 726 by suitable logic circuitry 727 under the control of a local memory unit 728.

The line code transmitted from the control terminal is recovered from the incoming bit stream by an AND gate 729 and stored in a line code register 730. At the same time, the trunk code is recovered by an AND gate 731 and stored in a trunk code register 732. Both AND gates 729 and 731 are supplied with SF1, OC, and TSS1 timing pulses, permitting them to select incoming digits from sub-frame 1 during odd cycles in time slot TSS1. Group timing pulses are supplied to AND gate 729 during groups GRS1, GRS2, and GR1 through GR5. Group timing pulses are supplied to AND gate 731 during groups GR6 through GR10.

Like counters 725 and 726, AND gates 729 and 731 and registers 730 and 732 are common to all of the subscriber lines served by the remote terminal. The outputs from registers 730 and 732 are supplied to a steering gate 733, which is individual to a subscriber line and operates when its line code is received from register 730 to pass the trunk code stored in register 732 to local memory circuit 728.

The operation of the system is best explained by tracing the progress of two calls, one from the central office to an outlying subscriber and the other from an outlying subscriber to the central office.

CALL FROM CENTRAL OFFICE

In the embodiment of the invention shown in FIG. 1, central office 101 is serving eighty individual subscriber lines. If a call is to be made to the subscriber served by line *n*, the central office switching equipment requests service by placing a ground on the sleeve of line *n*. That ground is detected and converted to binary "1" by the appropriate one of sleeve detectors 410 through 412 in the memory status and service processing equipment shown in FIG. 4. At the same time, the fourteen trunks which may be employed for transmission are being scanned by the channel selection equipment illustrated in FIG. 3.

In FIG. 3, trunk scanner 309 operates to supply binary "1" to each of message trunk AND gates 302 through 304 and overflow trunks 307 and 308 in sequence. If the first trunk TR1 is busy, a crosspoint connecting its horizontal to one of the eighty verticals is made and the resulting ground causes binary "0" to be supplied to AND gate 302. As a result, binary "0" is transmitted from AND gate 302 to scanning control network 310 and the scan continues. Select relay 315 has a built-in time delay and so does not operate unless the scan is halted. If the second trunk TR2 is idle, none of the crosspoints connecting its horizontal to a vertical is made, and binary "1" is supplied to AND gate 303 concurrently with the binary "1" from trunk scanner 309. This causes binary "1" to be transmitted from AND gate 303 to scanning control network 310, stopping the scan on trunk TR2. Since the scan is halted, select relay 316 operates and maintains message trunk TR2 in readiness for service.

At this point, note may be taken of the two overflow trunks and the operation of the channel selection equipment shown in FIG. 3 when all fourteen message trunks are busy. When all fourteen are busy, each trunk supplies binary "0" to its respective one of inverters 311 through 313. Each inverter than supplies binary "1" to AND gate 314. When that happens, AND gate 314 passes binary "1" to AND gates 305 and 306. Then, if overflow trunk OV1 is not in use, it supplies binary "1" through AND gate 305 to AND gate 307. When trunk scanner 309 reaches AND gate 307, binary "1" is supplied to scanning control network 310, halting the scan at that point and causing select relay 318 to operate. The scan remains stopped until overflow trunk OV1 becomes busy or until one of the fourteen message trunks TR1 through TR14 becomes idle. The operation is similar with respect to overflow trunk OV2. When either overflow trunk is in use, its respective busy signal generator is connected to the appropriate subscriber line by crossbar switch 201.

In the progress of the call presently under consideration, the first idle message trunk encountered by trunk scanner 309 is message trunk TR2 and the scan stops at that point, operating select relay 316. In the meantime, binary counter 404 and line code converter 406 in the memory status and service processing equipment shown in FIG. 4 have been operating to scan AND gates 407 through 409. Binary counter 404 is supplied with one timing pulse per frame and shifts from one state to the next at that rate. As a result, line code converter 406 applies binary "1" to the first AND gate 407 during the first frame, to the second AND gate 408 during the next, and so on until all eighty AND gates have been scanned. When the scan reaches the one of AND gates 407 through 409 associated with line *n*, the AND gates passes binary "1" through OR gate 413 to all eighty hold relays 414 through 416. Since line code converter 406 simultaneously applies binary "1" directly to the hold relay of the line being scanned, that particular hold relay operates, making the crosspoint between that vertical and horizontal 2 of crossbar switch 201 and causing the same binary "1" to be applied to the TR2 input of trunk translator 402.

When an input of trunk translator 402 is energized in the manner described, its identity is immediately translated into a four digit binary code appearing in parallel form on the four output leads. Thus, if binary "1" is supplied to the TR1 input the output is 0001, if binary "1" is supplied to the TR2 input the output is 0010, if binary "1" is supplied to the TR3 input the output is 0011, and so on. The four digit code is translated from parallel to serial form by parallel to serial converter 403. At the same time, the seven digit parallel output of binary counter 404 is converted to serial form by parallel to serial converter 405. With the aid of appropriate timing pulses, the outputs of converters 403 and 405 are transmitted over the digital line in sequence, in time division multiplex with other message, companding, and signaling information. In each frame, the digits of one line code from converter 405, followed by those of one trunk code from converter 403, are transmitted in time slot TSS1 in successive groups in the odd cycle of sub-frame 1. The seven digits of the line code are transmitted in groups GRS1, GRS2, and GR1 through GR5. The four digits of the trunk code are transmitted in groups GR6 through GR10.

Selection of a trunk for transmission of the message to the appropriate remote subscriber line carries with it a selection of the corresponding time division channel. The channel unit, which is illustrated in FIG. 6, of the selected trunk confines the transmitted message companding, and ringing information to their respective time slots in the digital bit stream and the resulting binary digits travel along the outward line until they come to the right remote terminal.

One of the important features of the invention is the manner in which complete flexibility of time-division channel assignment is achieved. Because of the 80 to 14 concentration afforded, it is particularly important that each of the eighty subscriber lines have access to any of the fourteen trunks and time-division channels that may be idle and available for use. This is accomplished in the illustrated embodiment of the invention through transmission of both line and trunk codes over the digital line, regularly updating them to avoid the possibility of error, and using them at the remote terminal to associate the trunk code with the line to which it has been assigned to determine the time-division channel from which digits are to be extracted and reinserted.

The line code is extracted from the bit stream by AND gate 729 in the remote terminal illustrated in FIG. 7 and stored in line code register 730. The accompanying trunk code is extracted by AND gate 731 and stored in trunk code register 732. Steering gate 733 operates when, and only when, the line code for its particular line appears on line code register 730 and reads the trunk code stored on trunk code register 732 into local memory unit 728. Thus, if the line is subscriber line 22, and line code 22 and trunk code 9 appear on register 730 and 732, steering gate 733 reads trunk code 9 into memory unit 728. If the line code appearing on register 730 is anything else, steering gate 733 does not operate and no trunk code is read into memory unit 728. If the line code is received without an accompanying trunk code, a time-division channel is no longer assigned and the previously stored trunk code is erased from memory unit 728.

The line and trunk code information relating to the called subscriber line is updated once each eighty frames in the illustrated embodiment of the invention, which amounts to a rate of approximately 19 Hz. Any transmission errors are thus immediately corrected and any changes in status are immediately received at the remote terminal.

Once a trunk code has been stored in local memory unit 728 in FIG. 7, it is used by the comparison logic circuit 727 to select channel and group timing pulses CH and GR having the same sequence position from counters 725 and 726. If trunk code $n$ is stored, channel pulses occupying time slot TS$n$ and group pulses occupying group GR$n$ are selected. More specifically, if the stored trunk code is 9, the selected channel and group channel pulses are TS9 and GR9, respectively. As shown in FIG. 7, the channel timing pulses CH are applied to AND gate 703 to extract message digits from time slot TS$n$ of each group in the incoming bit stream and to AND gate 716 to insert message digits in time slot TS$n$ of each group in the outgoing bit stream. At the same time, the group timing pulses GR are supplied to AND gate 708 to extract companding digits from group GR$n$ in the incoming bit stream, to AND gate 709 to extract ringing digits from group GR$n$ in the incoming bit stream, to AND gate 720 to insert companding digits in group GR$n$ in the outgoing bit stream, and to AND gate 722 to insert signaling digits in group GR$n$ in the outgoing bit stream.

When the central office switching equipment applies a ringing signal to the called subscriber line, the ringing signal is detected by ringing digitor 610 in the assigned channel unit, shown in FIG. 6, and there converted to binary "1" and transmitted in time slot TSS2 of group GR$n$ during each odd cycle. This binary "1" is recovered at the appropriate remote terminal, shown in FIG. 7, by AND gate 709 and converted by ringing receiver 710 to a form suitable for operating ringing relay R. Make contact 712 of relay R operates, applying a local ringing signal to the called subscriber line.

When the called subscriber line goes off-hook, the resulting loop closure is detected by loop closure detector 721 in FIG. 7, supplying binary "1" to AND gate 722, which inserts it in time slot TSS2 of group GR$n$ in odd cycles. This binary "1" is received back in the channel unit shown in FIG. 6 by AND gate 618, resulting in the operation of relay LC and the application of a low impedance simulating the closed loop condition across trunk 601. When the called subscriber hangs up, loop closure detector 721 in FIG. 7 transmits binary "0" which is received back in the channel unit and releases relay LC, signaling the central office equipment that the called subscriber line is again on-hook.

CALL FROM OUTLYING SUBSCRIBER

A call from an outlying subscriber to the central office follows a sequence quite similar to that which has just been described but is initiated in a slightly different manner. The switch hook of each remote terminal line is scanned once each eighty frames in synchronism with receipt of the line code from the control terminal. Thus, the switch hook of line $n$ is scanned by AND gate 723 in the remote terminal shown in FIG. 7 simultaneously with the receipt of the line code for that line by AND gate 729 and with the application of binary "1" to that line by line code converter 406 in the memory status and service processing equipment shown in FIG. 4. When the subscriber telephone set is on-hook, binary "0" is transmitted back to the control terminal and the scan of crossbar switch 201 continues without interruption. When the subscriber telephone set goes off-hook, however, this is detected by loop closure detector 721 in FIG. 7 and inserted in the outgoing bit stream as binary "1" by AND gate 723. At the control terminal, this binary "1" is recovered by switch hook scan receiver 417 in FIG. 4 and applied through OR gate 413 to the hold relay for line $n$ simultaneously with the application of binary "1" from line code converter 406. The hold relay operates, making the crosspoint between its vertical of crossbar switch 201 and the available horizontal in the same manner that it did when it received binary "1" from the appropriate sleeve detector in the call originating from the central office. From that point on, the operation is the same.

What is claimed is:

1. A multichannel delta modulation message transmission system interconnecting a control terminal with at least one remote terminal and employing regularly recurring frames of binary digit time slots, each of said frames containing at least one cycle of a plurality of sequential groups and each of said groups including a sequential message digit time slot for each channel and at least one additional binary digit time slot exclusive of and in time sequence with said message digit time slots, which includes an arrangement for transmitting both message and associated non-message control information from said control terminal to said remote terminal over a selected channel comprising means at said control terminal for assigning a channel sequence position to the message, means at said control terminal for transmitting a message digit in each of said groups in the message digit time slot occupying said sequence position, means at said control terminal for transmitting an associated non-message control digit in at least one of said additional digit time slots in the group occupying said sequence position in at least some of said cycles, means at said control terminal for transmitting the identification of said sequence position to said remote terminal, means at said remote terminal for storing the received sequence position identification, means at said remote terminal for extracting message digits from the message digit time slot occupying said sequence position in each of said groups, and means at said remote terminal for extracting associated non-message control digits from at least some of said additional digit time slots in the group occupying said sequence position in at least some of said cycles.

2. A multichannel delta modulation message transmission system in accordance with claim 1 in which the identification of said sequence position is transmitted as a number to said remote terminal and said remote terminal includes a fast counter adapted to generate pulses at the repetition rate of said digit time slots, a slow counter adapted to generate pulses at the repetition rate of said groups, and means for selecting pulses from said counters occupying respective sequence positions corresponding to the stored sequence position identification number to control the extraction of both message and associated non-message control digits.

3. A multichannel delta modulation message transmission system in accordance with claim 2 in which the number identification of said sequence position is transmitted from said control terminal to said remote terminal in the form of binary digits in selected ones of said additional digit time slots.

4. A multichannel delta modulation message transmission system in accordance with claim 1 in which message companding digits are transmitted in said additional digit time slots during some of said cycles and signaling digits are transmitted in at least some of said additional digit time slots during others of said cycles.

5. A multichannel delta modulation message transmission system interconnecting a control terminal with a plurality of individual line circuits located at at least one remote terminal and employing regularly recurring frames of binary digit time slots, each of said frames containing at least one cycle of a plurality of sequential groups and each of said groups including a sequential message digit time slot for each channel and at least one additional binary digit time slot exclusive of and in time sequence with said message digit time slots, which includes an arrangement for transmitting both message and associated non-message control information from said control terminal to a selected one of said line circuits over a selected channel comprising means at said control terminal for assigning a channel sequence position to the message, means at said control terminal for transmitting a message digit in each of said groups in the message digit time slot occupying said sequence position, means at said control terminal for transmitting an associated non-message control digit in at least one of said additional digit time slots in the group occupying said sequence position in at least some of said cycles, means at said control terminal for transmitting both the identification of said sequence position and the identification of said selected line circuit to said remote terminal, means associated with said selected line circuit at said remote terminal and activated by receipt of said selected line circuit identification for storing the received sequence position identification, means connected to said selected line circuit at said remote terminal for extracting message digits from the message digit time slot occupying said sequence position in each of said groups, and means connected to said selected line circuit at said remote terminal for extracting associated non-message control digits from at least some of said additional digit time slots in the group occupying said sequence position in at least some of said cycles.

6. A multichannel delta modulation transmission system in accordance with claim 5 in which both the identification of said sequence position and the identification of said selected line circuit are transmitted as numbers to said remote terminal and said remote terminal includes a fast counter adapted to generate pulses at the repetition rate of said digit time slots, a slow counter adapted to generate pulses at the repetition rate of said groups, and means for selecting pulses from said counters occupying respective sequence positions corresponding to the stored sequence position idenification number to control the extraction of both message and associated non-message control digits.

7. A multichannel delta modulation message transmission system in accordance with claim 6 in which the number identifications of both said sequence position and said selected line circuit are transmitted from said control terminal to said remote terminal in the form of binary digits in selected ones of said additional digit time slots.

8. A multichannel delta modulation message transmission system in accordance with claim 5 in which message companding digits are transmitted in said additional digit time slots during some of said cycles and signaling digits are transmitted in at least some of said additional digit time slots during others of said cycles.

References Cited

UNITED STATES PATENTS 3,258,536 6/1966 Lugten.
3,456,082 7/1969 Brown.
3,459,896 8/1969 Bartlett.

RALPH D. BLAKESLEE, Primary Examiner